United States Patent [19]

Ziegler et al.

[11] Patent Number: 4,571,028
[45] Date of Patent: Feb. 18, 1986

[54] MOUNT FOR AN OPTICAL COMPONENT

[75] Inventors: Klaus Ziegler, Heerbrugg; Peter Zünd, Balgach; Jürg Gees, Heerburgg; Josef Mäder, Rebstein, all of Switzerland

[73] Assignee: Wild Heerbrugg Aktiengesellschaft, Heerbrugg, Switzerland

[21] Appl. No.: 384,635

[22] Filed: Jun. 3, 1982

[30] Foreign Application Priority Data

Jun. 11, 1981 [CH] Switzerland .................. 3853/81

[51] Int. Cl.⁴ .................... G02B 7/18; G02B 7/00
[52] U.S. Cl. .................................. 350/287; 350/252
[58] Field of Search ............................ 350/252, 287

[56] References Cited

U.S. PATENT DOCUMENTS

| 904,066 | 12/1908 | Jacob | 350/287 |
| 1,821,623 | 8/1931 | Emmerich | 350/252 |
| 3,796,098 | 3/1974 | Trayer | 350/252 |
| 3,963,327 | 6/1976 | Poirier | 350/287 |
| 4,238,151 | 12/1980 | Yoshikawa | 354/152 |

FOREIGN PATENT DOCUMENTS

| 1572625 | 2/1970 | Fed. Rep. of Germany . |
| 2022561 | 11/1970 | Fed. Rep. of Germany . |
| 2140317 | 2/1973 | Fed. Rep. of Germany . |
| 651732 | 4/1951 | United Kingdom . |

Primary Examiner—Buce Y. Arnold
Assistant Examiner—William Propp
Attorney, Agent, or Firm—Roylance, Abrams, Berdo & Goodman

[57] ABSTRACT

Mount for optical components, particularly a prism, ensuring a statically defined mounting of the optical component mounted in a self-aligned manner. The mount includes a curved surface to receive an optical component with a flat surface with line contact of the flat surface edges on the curved surface. Further attachment devices, including at least one resilient element, hold the component in other directions. Several embodiments are disclosed.

11 Claims, 12 Drawing Figures (TOP VIEW)

(FRONT VIEW)

(RIGHT SIDE VIEW)

(REAR VIEW)

MOUNT FOR AN OPTICAL COMPONENT

This invention relates to a mount for an optical component, particularly a prismatic component.

BACKGROUND OF THE INVENTION

Previously known mounting devices for optical components have a cylindrical shape with a circular or square cross section. In the interior of the mount is mounted a prism such as a Dove prism in such a way that the portions of the reflecting surface along the edges thereof rest on matched bearing surfaces shaped as steps, or on inserts in the cylindrical body. On the opposite side of the mount, in the area of the optically unused part of the prism, the prism is secured by a segment engaging thereon and held by a set screw.

In another known type of mount, the prism is carried in a cylindrical support by adjusting screws or is secured by adhesive.

In both cases, the adjustment accomplished through the production of matched bearing surfaces or by setting, as well as securing, the adjusting screws requires a large amount of skill. In addition, inspection is very complicated and costly. Furthermore, distortions occur in the optically active areas of the optical component. Thermal stresses also occur due to the different thermal expansion coefficients of the mount material and the glass material and these cannot be compensated when the optical components are fixed, resulting in a reduction of the quality of the instrument.

BRIEF SUMMARY OF THE INVENTION

Accordingly, an object of the present invention is to overcome these disadvantages and to provide a mount which insures distortion-free, precise mounting for the self alignment of the optical component over a wide temperature range, while also insuring fitting in such a way that no reworking is necessary.

Briefly described, the invention includes a mount for an optical component of the type having a flat surface between two parallel edges, comprising a support body having means defining a concave cylindrical surface for receiving the component with the parallel edges thereof contacting said cylindrical surface along two lines, and fixing means attached to the body for engaging at least one other surface of the component, the fixing means including at least one resilient element for obtaining a statically defined mounting with selfalignment of the component.

As will be recognized from the description of the preferred embodiments, the support can be formed as a hollow cylinder for receiving a prismatic optical component in its interior with tangential planes defined by the contact lines in the cylinder having a larger angular aperture, or larger included angle, than the tangential planes of the corresponding contact lines of the optical component.

Advantageously, the support body is a circular cylinder so that it can easily be incorporated into an optical instrument, being rotatable about its axis.

In addition, the structure can include two fixing means, one of which can be fixed and the other detachably connected to the support body, the detachable means having at least one elastic or resilient element, the fixing means being arranged to press the optical component against the support body.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE DRAWINGS

Figure 1:
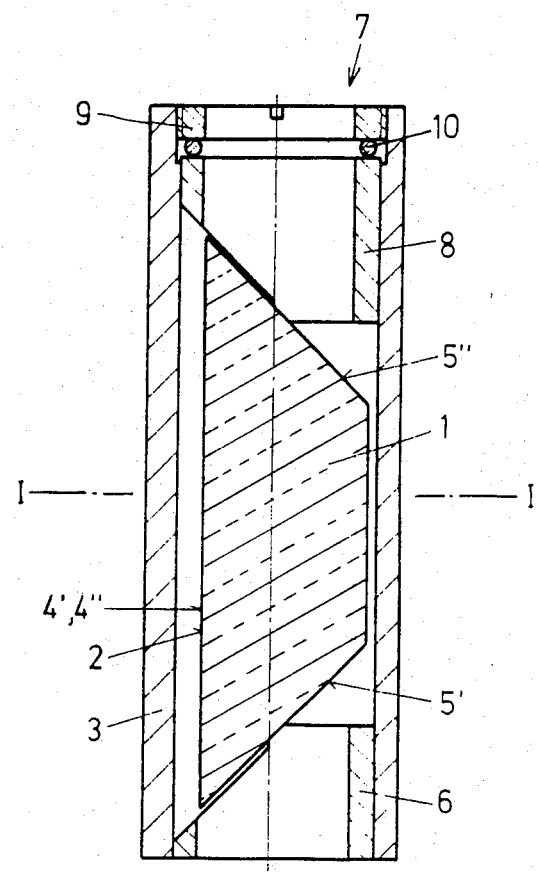
FIG. 1 is a side elevation, in section, of a Dove prism mounted in a cylindrical support body in accordance with the present invention.
Figure 2:
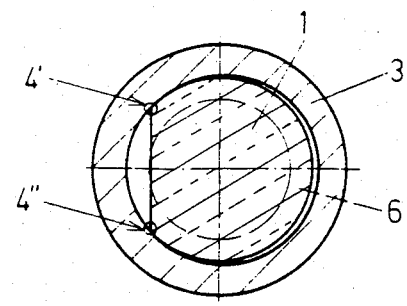
FIG. 2 is a transverse sectional view along line I—I of FIG. 1.

FIGS. 1 and 2 show a mount for a Dove prism 1 which, for reasons of low production cost, is preferably plain ground and optically polished on the planar reflecting surface 2. The mount in accordance with the invention includes a support body 3 having a circular cylindrical shape and an internal surface which is very accurately geometrically ground, the cylindrical shape being chosen, once again, for reasons of simpler, less expensive and more accurate manufacture. When the prism is mounted in the support body, the prism 1 rests on the inner surface of support body 3 along parallel straight lines of contact with parallel straight prism edges 4', 4" which are formed by and constitute the side edges of the reflecting surface 2. Thus, the parallel prism edges are in contact with parallel lines along the interior of the cylindrical shell. At one end of body 3 is a circular cylindrical fixing means 6 fixedly attached to body 3, this fixing means being in the shape of a tubular member having a face chamfered at an angle to meet with chamfered planar end face 5' at one end of the Dove prism 1, which face rests on the fixing means. At the other end of body 3, a further fixing means indicated generally at 7 includes a similarly shaped tubular bearing member 8, the chamfered face of which rests against chamfered, planar end face 5" of the prism. Member 8 is pressed against the prism by a resilient or elastic O-ring 10 and an externally threaded ring 9 which is screwed into internal threads provided at the upper end of member 3. As will be recognized, the degree of pressure can be adjusted by the degree of threaded engagement of the ring 9. Except for the chamfered end faces 5' and 5" and the planar reflecting surface 2, the prism 1 is cylindrical.

Figure 3:
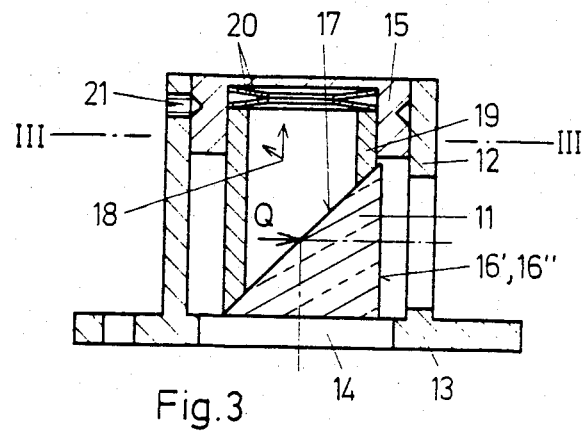
FIG. 3 is a side elevation, in section, of a further embodiment of a mount in accordance with the invention for a reflecting prism.
Figure 4:
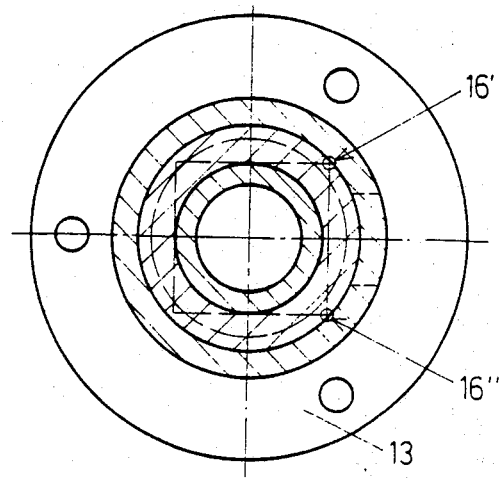
FIG. 4 is a transverse sectional view along line III—III of FIG. 3.

Referring now to FIGS. 3 and 4, these figures show a prism mount for a reflecting prism 11 wherein the mount includes a tubular support body 12 having at one end a flange 13. The flange includes a radially outwardly extending portion which serves as a supporting arrangement for the prism mount, and a radially inwardly extending portion which serves as part of the fixing means secured to tube 12 in that an opening 14 is provided therein which has a diameter smaller than the diagonal dimension of the surface of prism 11 which rests thereon. Thus, only the corners of the prism rest on the inwardly extending portion of the flange. Reflecting prism 11 is held in place by a circular cylindrical sleeve 15, the prism being inserted in the tube 12 in such a way that two of the edges 16', 16" of the prism which are defined by perpendicular surfaces not resting on the flange, rest on the inner cylindrical surface of the tube. Thus, the prism engages the tube along two lines of contact in a manner similar to the structure of FIGS. 1 and 2. It will also be observed that tube 12 has an opening in the side thereof adjacent the beam emergence surface of the prism, the surface across opening 14 being the beam entry surface.

A fixing means 18 for holding the prism in place includes a tubular chamfered support member 19, the sloping surface of which rests on reflecting surface 17 of the reflecting prism, the member being pressed against the prism by two cup springs 20 which are enclosed within a cup-shaped sleeve 15. Sleeve 15 is secured within tube 12 by a set screw 21 which extends through tube 12 and into an annular slot in the exterior of sleeve 15.

Figure 5:
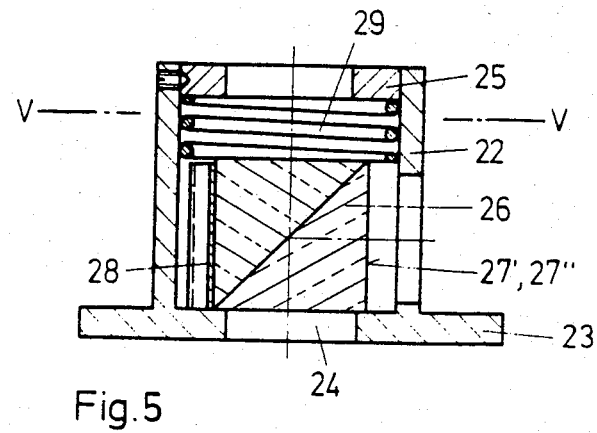
FIG. 5 is a side elevation, in section, of a mount for a compound reflecting prism in accordance with the invention.
Figure 6:
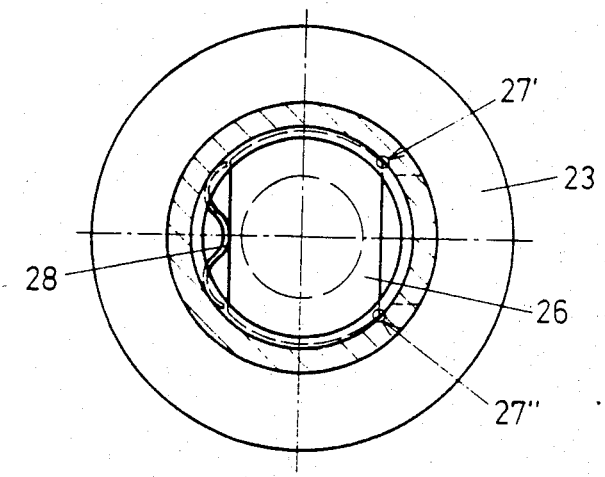
FIG. 6 is a transverse sectional view along line V—V of FIG. 5.

FIGS. 5 and 6 show a mounting arrangement in accordance with the invention for a different form of reflecting prism, the mount being similar in some ways to the mount shown in FIGS. 3 and 4. A two-part reflecting prism 26 is inserted in a circular cylindrical support body 22 having a flange 23 with a circular opening 24 located so that the prism rests on flange 23 with the beam entry surface thereof having a diagonal dimension larger than the diameter of opening 24. The emergence surface of the prism is defined by edges 27', 27" which engage in linear contact along the inner wall of sleeve 22. The prism structure is pressed against the sleeve by a first spring 28, which is a leaf spring and which urges the prism toward the direction of the line contact. The structure is held against flange 23 by a second spring 29, illustrated as a compression coil spring, which bears against the upper corner areas of the prism, the second spring being held in place by a removable retaining ring 25, retained in turn by a set screw.

Figure 7:
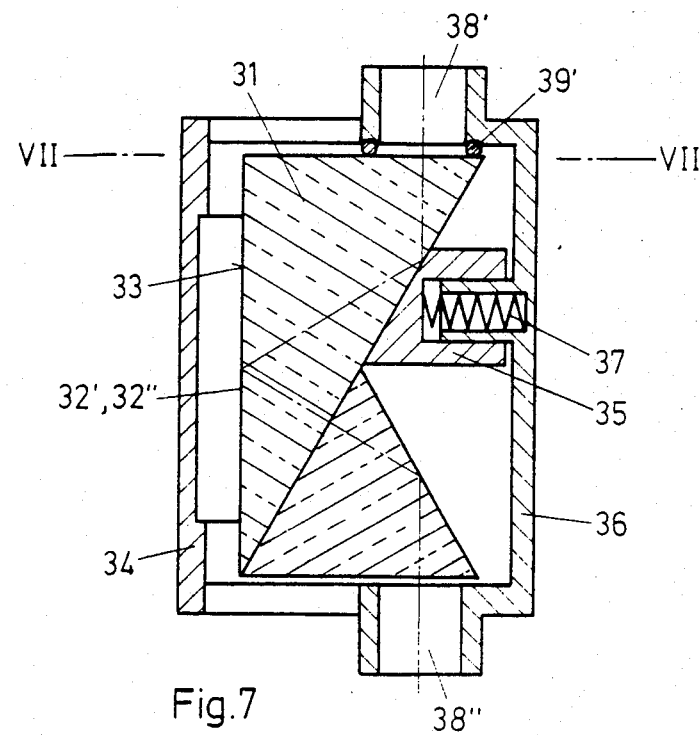
FIG. 7 is a side elevation, in section of a mount for a direct vision prism in accordance with the invention.
Figure 8:
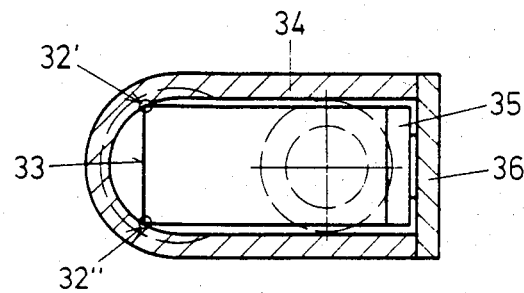
FIG. 8 is a transverse sectional view along line VII—VII of FIG. 7.
Figure 9:
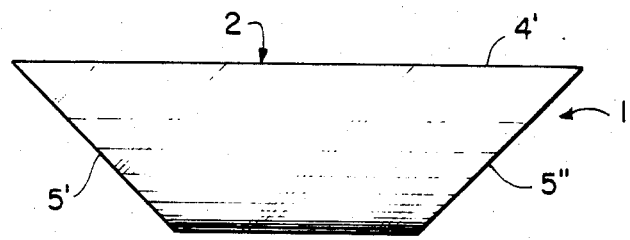
FIG. 9 is a top plan view of the prism 1 of FIGS. 1 and 2 shown by itself and including a reflecting surface 2 defined between straight edges 4' and 4" and two opposed chamfered end faces 5' and 5"
Figure 10:
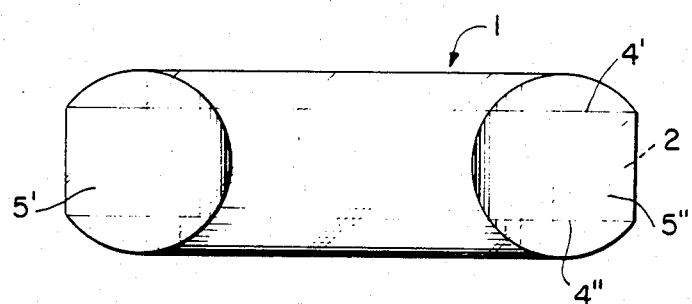
FIG. 10 is a front elevational view of the prism 1 showing the two opposed chamfered end faces 5' and 5"
Figure 11:
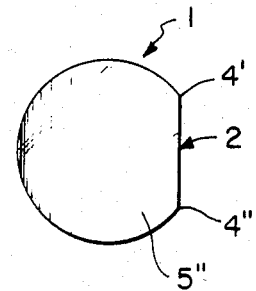
FIG. 11 is a right side elevational view of the prism 1 showing the right end face 5"
Figure 12:
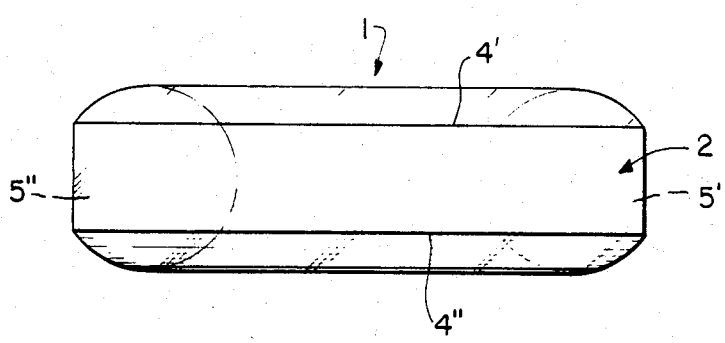
FIG. 12 is a rear elevational view of the prism 1 showing the reflecting surface 2 defined between the straight edges 4' and 4".

FIGS. 7 and 8 show a mount for a direct vision prism 31 which has two bearing edges 32', 32" defining the lateral, parallel sides of reflecting surface 33. The prism rests in a U-shaped support 34 with the edges defining lines of contact along the concave inner surface of the curved portion of the support. The fixing means is constructed somewhat in the manner of a cover 36 for the support body. The fixing means includes a pressure member 35 having a sloping surface engaging the facing surface of prism 31, the member having a generally cylindrical recess forming a cylinder. Cover 36 is provided with a hollow pin, acting somewhat like a piston, and containing a compression coil spring 37, the spring tending to urge the piston and cylinder member away from each other. At opposite ends of the support body are opening 38', 38" in cover 36 to permit entry and emergence of the light beam acted on by the prism. At one end of the cover and adjacent the opening 38' is an O-ring 39' which engages with and axially secures the prism.

A common feature of these prism mounts is that the prism engages on a support along two bearing edges and is held in such a way that its mounting is statically determined and self-aligned i.e., there are two degrees of fixing freedom. This type of mount is not restricted to prisms and can be used for any correspondingly shaped or shapeable optical components.

By "two degrees of fixing freedom" it is meant that the bearing edges determine, with precision, the location of the prism in a direction defined by one of three orthogonal axis. Thus, movement is absolutely prevented along that axis which, in the embodiment of FIGS. 7 and 8, is perpendicular to the plane of the drawing in FIG. 7. Adjustment, elastic movement and movement as a result of temperature changes are, however, possible along the other two axis, counter to the force of spring 37 and tending to compress or expand the resilient O-ring 39'.

As can be particularly well understood with reference to FIG. 2, one can construct planes tangential to contact lines 4', 4" based on the center of either the optical element 1 or support body 3. The centers of these components differ from each other, meaning that the planes tangential to the contact lines also differ. It is significant to note that the planes tangential to the lines of contact constructed with reference to support body 3 have a larger included angle than the planes tangential to the corresponding contact lines based on the center of the optical component.

The structures described herein give a completely satisfactory mounting of optical components over a wide temperature range, and there is no need for the otherwise conventional, and very time consuming, adjustment and reworking which previously has been necessary for such components. This adjustment work requires many assemblies and disassemblies of the prisms for the purpose of reworking the bearing surfaces. The subsequent fixing of the prisms in position by means of adhesives has, in the past, led to mounting structures which permitted no expansion compensation in the event of temperature fluctuations. The nature of the mounting and fixing also made it virtually impossible to prevent stresses in the optical component so that additional stresses, such as vibrations, led to fracture of the optical elements.

With the type of mount disclosed herein, there is also no need for the devices and gauges required for adjustment and reworking. Furthermore, in comparable cases smaller mount dimensions are possible while reducing the sensitivity to impact, vibratory and thermal stresses, as has been proved by tests. Furthermore, the optically active surface is always parallel to The mechanical mount axis which often serves as the rotation axis of the component. Thus, after incorporating the optical component there is no need for setting work, the precision being achieved by the individual working of the parts and not, as before, by adjustment and reworking.

While certain advantageous embodiments have been chosen to illustrate the invention it will be understood by those skilled in the art that various changes and modifications can be made therein without departing from the scope of the invention as defined in the appended claims.

What is claimed is:

1. A mount, for an optical component having a flat surface between two parallel edges, comprising:
   a support body having means defining a concave cylindrical surface for receiving the optical component with the two parallel edges thereof contacting said cylindrical surface along two parallel lines; and
   fixing means attached to said support body, for engaging at least one other surface of the optical component, and for engaging the two parallel edges of the optical component against said concave cylindrical surface,
   said fixing means including at least one resilient element for obtaining a statically defined mounting with self-alignment of the optical component in said support body.

2. A mount according to claim 1, wherein
   said support body comprises a hollow cylinder for receiving a prismatic optical component in its interior, said support body having planes tangential to the lines of contact with the parallel edges of the optical component which define a larger included angle than the planes tangential to the two parallel edges of the optical component, the optical component being circular in end elevation except for the flat surface between the two parallel edges.

3. A mount according to claim 2, wherein said support body is a circular cylinder.

4. A mount according to claim 1 and including first and second fixing means,
   the first of said fixing means being fixedly attached to said support body and the second fixing means being detachably connected to said support body,
   the detachably connected second fixing means including said at least one resilient element so that said first and second fixing means press the optical component against said support body.

5. A mount according to claim 4, wherein said fixedly attached fixing means forms part of and is unitarily constructed with said support body.

6. A mount according to claim 4, wherein said resilient element comprises a spring.

7. A mount according to claim 6 wherein said spring is a helical spring.

8. A mount according to claim 4 wherein said resilient element is an O-ring.

9. A mount according to claim 1, wherein
   the two parallel edges on the optical component are straight, and
   said two parallel lines on said cylindrical surface are straight.

10. A mount according to claim 9, wherein
    said two parallel straight lines on said cylindrical surface extend longitudinally thereof.

11. A mount according to claim 1, wherein
    said two parallel lines on said cylindrical surface extend longitudinally thereof.

* * * * *